US011645243B2

(12) United States Patent
Brossard et al.

(10) Patent No.: US 11,645,243 B2
(45) Date of Patent: May 9, 2023

(54) ACCESSING FILES IN A DATABASE STAGE USING A USER DEFINED FUNCTION

(71) Applicant: Snowflake Inc., Bozeman, MT (US)

(72) Inventors: Elliott Brossard, Kirkland, WA (US); Sukruth Komarla Sukumar, Bellevue, WA (US); Isaac Kunen, Seattle, WA (US); Ju-yi Kuo, Sammamish, WA (US); Jonathan Lee Leang, Seattle, WA (US); Edward Ma, San Jose, CA (US); Schuyler James Manchester, San Jose, CA (US); Polita Paulus, Kirkland, WA (US); Saurin Shah, Kirkland, WA (US); Igor Zinkovsky, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/522,276

(22) Filed: Nov. 9, 2021

(65) Prior Publication Data

US 2022/0391357 A1 Dec. 8, 2022

Related U.S. Application Data

(60) Provisional application No. 63/197,803, filed on Jun. 7, 2021.

(51) Int. Cl.
*G06F 12/00* (2006.01)
*G06F 16/00* (2019.01)
*G06F 16/182* (2019.01)
*G06F 9/54* (2006.01)
*G06F 16/14* (2019.01)
(Continued)

(52) U.S. Cl.
CPC ............ *G06F 16/183* (2019.01); *G06F 9/547* (2013.01); *G06F 16/13* (2019.01); *G06F 16/148* (2019.01); *G06F 16/176* (2019.01)

(58) Field of Classification Search
None
See application file for complete search history.

(56) References Cited

U.S. PATENT DOCUMENTS 8,863,082 B2   10/2014   Tsao et al.
9,020,992 B1   4/2015   Gunda et al.
(Continued)

FOREIGN PATENT DOCUMENTS

WO    2022261616 A1    12/2022

OTHER PUBLICATIONS

"U.S. Appl. No. 16/942,352, Examiner Interview Summary dated Dec. 7, 2020", 3 pgs.
(Continued)

*Primary Examiner* — Tuan A Pham
(74) *Attorney, Agent, or Firm* — Schwegman Lundberg & Woessner, P.A.

(57) ABSTRACT

A file access system for user defined functions (UDFs) can be implemented on a distributed database system. The system can store UDF signatures and interfaces (e.g., classes, sub-classes) that can be called by other users. Upon a UDF being called, one or more interface objects (e.g., InputStream) can be created and requests transferred to a execution node via a network channel. The execution node can implement multiple threads that are authorized and download file data from a staging location (e.g., internal stage, external stage) concurrently.

30 Claims, 8 Drawing Sheets

(51) Int. Cl.
*G06F 16/176* (2019.01)
*G06F 16/13* (2019.01)

(56) References Cited

U.S. PATENT DOCUMENTS

| | | | |
|---|---|---|---|
| 9,781,602 | B1 | 10/2017 | Girdhar et al. |
| 10,997,243 | B1 | 5/2021 | Paulus et al. |
| 11,361,026 | B2 | 6/2022 | Brossard et al. |
| 11,423,081 | B1 | 8/2022 | Brossard et al. |
| 11,550,845 | B2 | 1/2023 | Brossard et al. |
| 2002/0116385 | A1* | 8/2002 | Kagalwala .......... G06F 21/6218 |
| 2006/0010419 | A1 | 1/2006 | Haselden |
| 2013/0061208 | A1 | 3/2013 | Tsao et al. |
| 2014/0330875 | A1 | 11/2014 | Gulamali |
| 2015/0193465 | A1 | 7/2015 | Schoeffler et al. |
| 2015/0199533 | A1 | 7/2015 | Chou Fritz et al. |
| 2016/0132572 | A1 | 5/2016 | Chang et al. |
| 2017/0031929 | A1 | 2/2017 | Mackay et al. |
| 2017/0264687 | A1 | 9/2017 | Beerana et al. |
| 2018/0150528 | A1* | 5/2018 | Shah ..................... G06F 16/282 |
| 2018/0302412 | A1 | 10/2018 | Achtermann et al. |
| 2019/0008981 | A1 | 3/2019 | Wu et al. |
| 2019/0020541 | A1 | 7/2019 | Goldberg et al. |
| 2019/0236350 | A1* | 8/2019 | Kozlovsky .............. G06F 16/93 |
| 2019/0253476 | A1* | 8/2019 | Lee ....................... G06F 16/213 |
| 2021/0034606 | A1 | 2/2021 | Stamos et al. |
| 2021/0064588 | A1* | 3/2021 | Fender .................... G06F 9/541 |
| 2021/0081389 | A1 | 3/2021 | Liu et al. |
| 2021/0240697 | A1* | 8/2021 | Rielau ................. G06F 16/2379 |
| 2021/0406311 | A1 | 12/2021 | Brossard et al. |
| 2022/0237231 | A1 | 7/2022 | Brossard et al. |

OTHER PUBLICATIONS

"U.S. Appl. No. 16/942,352, Non Final Office Action dated Sep. 3, 2020", 12 pgs.

"U.S. Appl. No. 16/942,352, Notice of Allowance dated Jan. 21, 2021", 9 pgs.

"U.S. Appl. No. 16/942,352, Response filed Dec. 2, 2020 to Non Final Office Action dated Sep. 3, 2020", 13 pgs.

"U.S. Appl. No. 17/244,349, Examiner Interview Summary dated Oct. 15, 2021", 2 pgs.

"U.S. Appl. No. 17/244,349, Non Final Office Action dated Jul. 9, 2021", 14 pgs.

"U.S. Appl. No. 17/244,349, Response filed Oct. 7, 2021 to Non Final Office Action dated Jul. 9, 2021", 12 pgs.

"U.S. Appl. No. 17/390,969, Notice of Allowance dated Sep. 29, 2021", 10 pgs.

"U.S. Appl. No. 17/390,969, Preliminary Amendment Filed Aug. 5, 2021", 7 pgs.

"International Application Serial No. PCT/US2021/034530, International Search Report dated Jun. 29, 2021", 2 pgs.

"International Application Serial No. PCT/US2021/034530, Written Opinion dated Jun. 29, 2021", 4 pgs.

"U.S. Appl. No. 17/463,325, Non-Final Office Action dated Nov. 26, 2021", 13 pgs.

"U.S. Appl. No. 17/390,969, Notice of Allowance dated Apr. 14, 2022", 8 pgs.

"U.S. Appl. No. 17/463,325, Notice of Allowance dated Mar. 22, 2022", 9 pgs.

"U.S. Appl. No. 17/463,325, Response filed Feb. 24, 2022 to Non Final Office Action dated Nov. 26, 2021", 12 pgs.

"U.S. Appl. No. 17/657,548, Non Final Office Action dated Jun. 9, 2022", 10 pgs.

"U.S. Appl. No. 17/657,548, Response filed Sep. 7, 2022 to Non Final Office Action dated Jun. 9, 2022", 10 pgs.

"International Application Serial No. PCT/US2022/072771, International Search Report dated Jul. 26, 2022", 2 pgs.

"International Application Serial No. PCT/US2022/072771, Written Opinion dated Jul. 26, 2022", 3 pgs.

"U.S. Appl. No. 17/657,548, Notice of Allowance dated Sep. 23, 2022", 9 pgs.

"U.S. Appl. No. 17/657,548, Corrected Notice of Allowability dated Oct. 7, 2022", 6 pgs.

* cited by examiner

ACCESSING FILES IN A DATABASE STAGE USING A USER DEFINED FUNCTION

CROSS-REFERENCE TO RELATED APPLICATION

This application claims the benefit of priority to U.S. Provisional Patent Application Ser. No. 63/197,803 filed Jun. 7, 2021, the contents of which are incorporated by reference in their entirety.

TECHNICAL FIELD

Embodiments of the disclosure relate generally to a network-based database system or a cloud data platform and, more specifically, to implementing file access to user defined functions of a database.

BACKGROUND

Cloud-based data systems such as data warehouses provide users an ability to track and manage large amounts of data. Users can implement functions to process the data, such as user defined functions. However, implementing user defined functions on databases is restricted and it is often not practical to scale use of the user defined functions to enable access to a large file (e.g., a one terabyte file) or a large number of files (e.g., 1,000,000 image files).

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed it can be difficult to implement database user defined functions (UDFs) in a scalable approach that can access large files. To this end, a function file access system can store one or more UDF signatures specifying a function name and that take a path to files on a stage (e.g., internal storage, external storage). The instructions of the UDF can be uploaded and stored on a database system (e.g., for a Java UDF, Java code is stored). The UDF can be shared and executed in the distributed database between users. For example, a provider account user can create a UDF and share access to it to enable a consumer account user to call the UDF. When the consumer account user calls the UDF, the system determines that the string corresponds to an UDF interface (e.g., such as Java InputStream), which has a pointer to the stage file (e.g., where the stage name is specified in the UDF signature, along with other parameters such as a location in the stream (e.g., "0", "1000"). An execution node can receive the UDF requests over a network channel and authenticate that the user has access to the files, and if transfers credentials to threads of the execution node. The threads of the execution node can then retrieve and cache the file contents as pages in local memory of the execution node. In some example embodiments, the pages pre-cached such that pages that are later requested are already stored on the execution node. In some example embodiments, the system 230 perform just-in-time retrieval and the pages are pre-cached but are rather downloaded only upon being requested by a given UDF (e.g., one or more streams in a given UDF).

Figure 1:
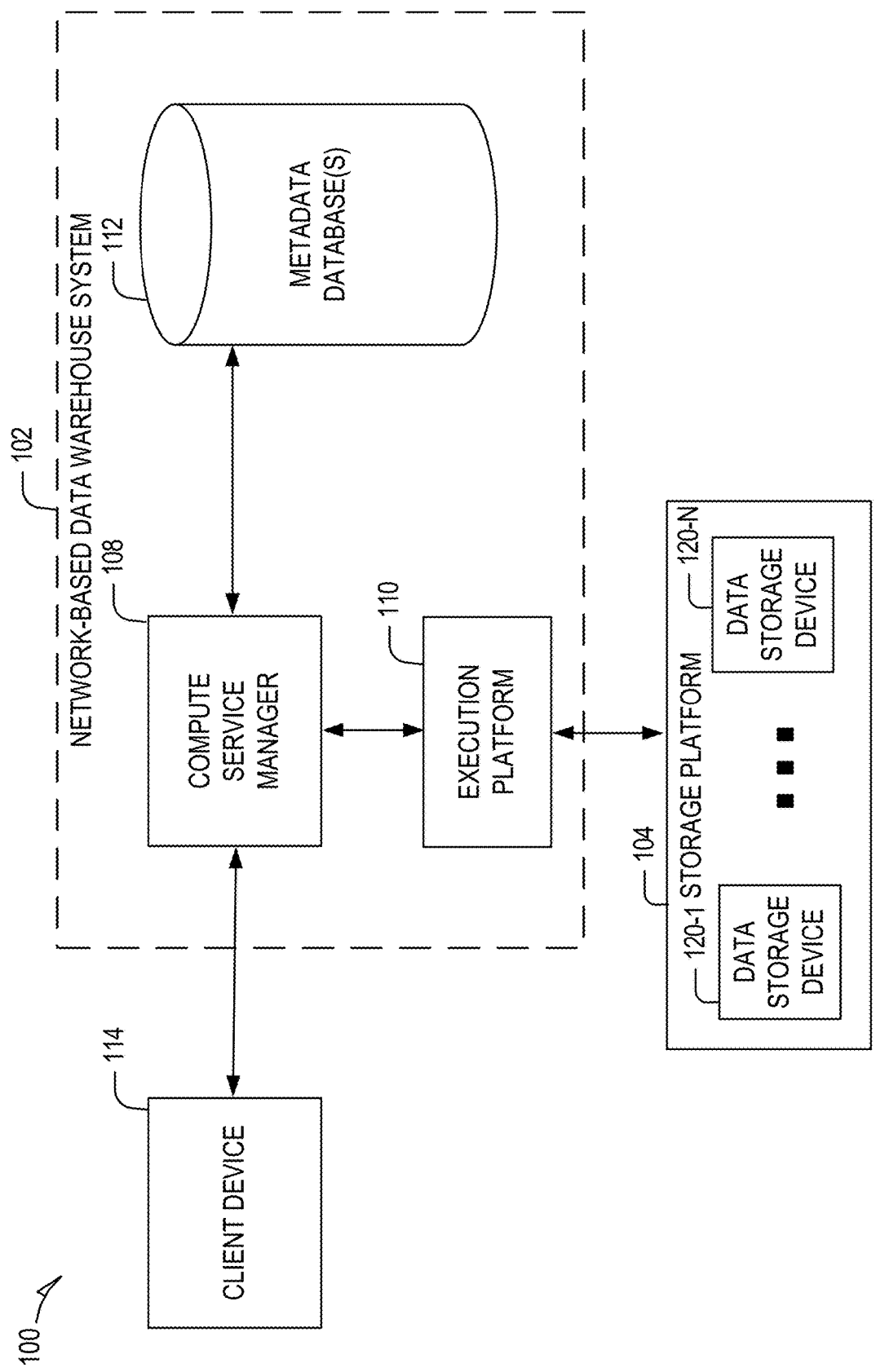
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage). The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
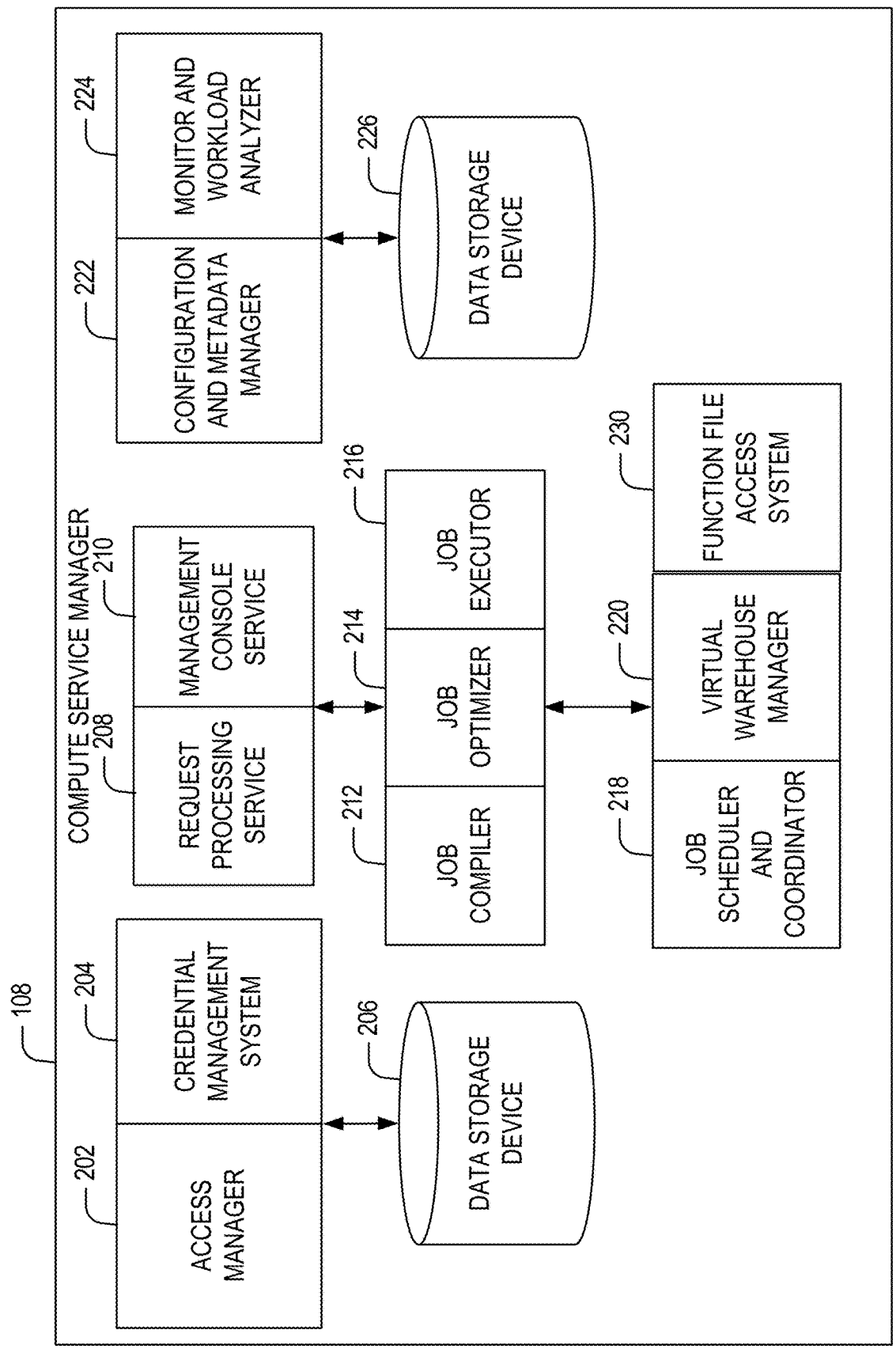
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The function file access system 230 is configured to manage file access to files in a stage (e.g., internal or external stage) using user defined function signatures and UDFs that point to the stage, as discussed in further detail below.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
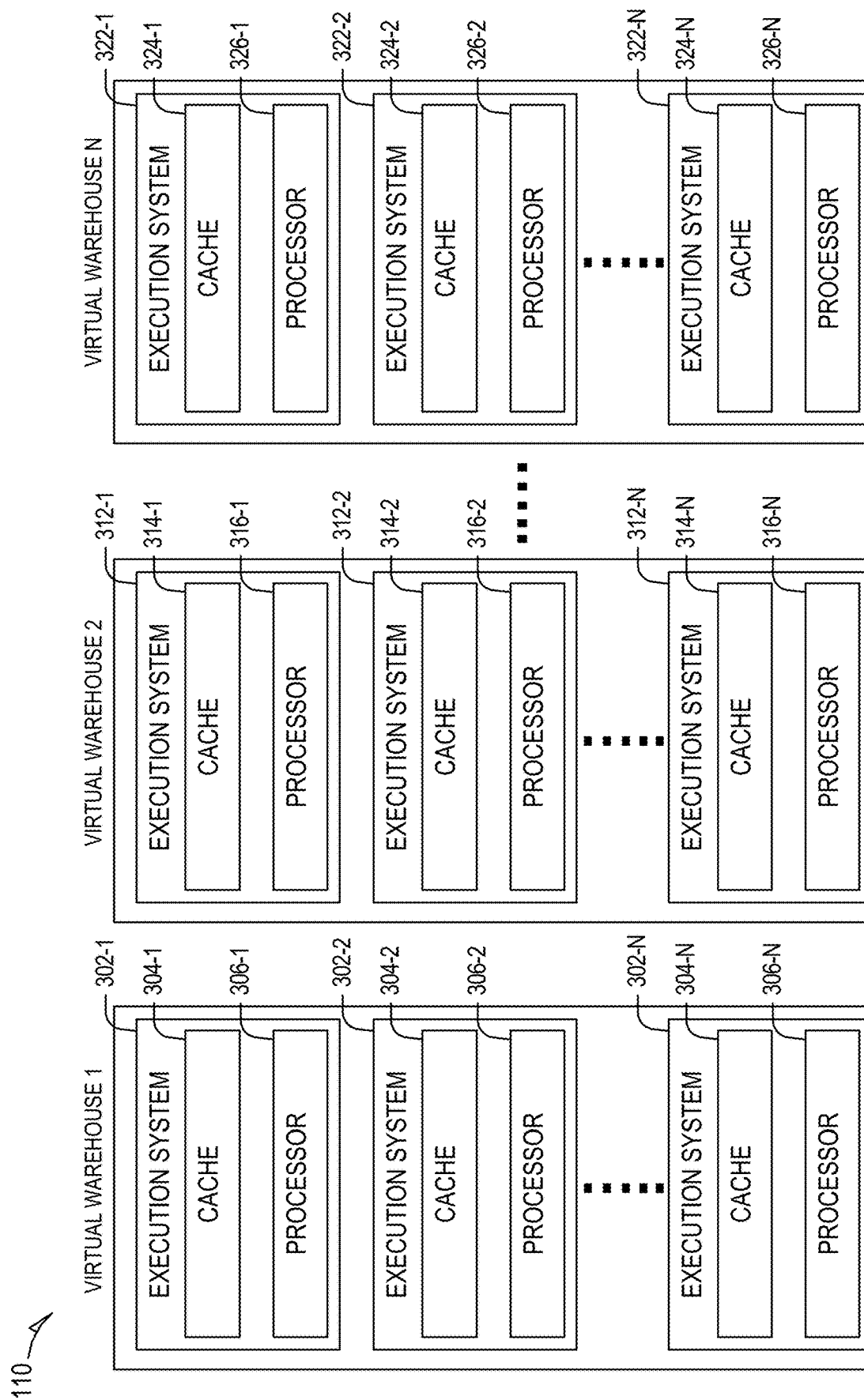
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
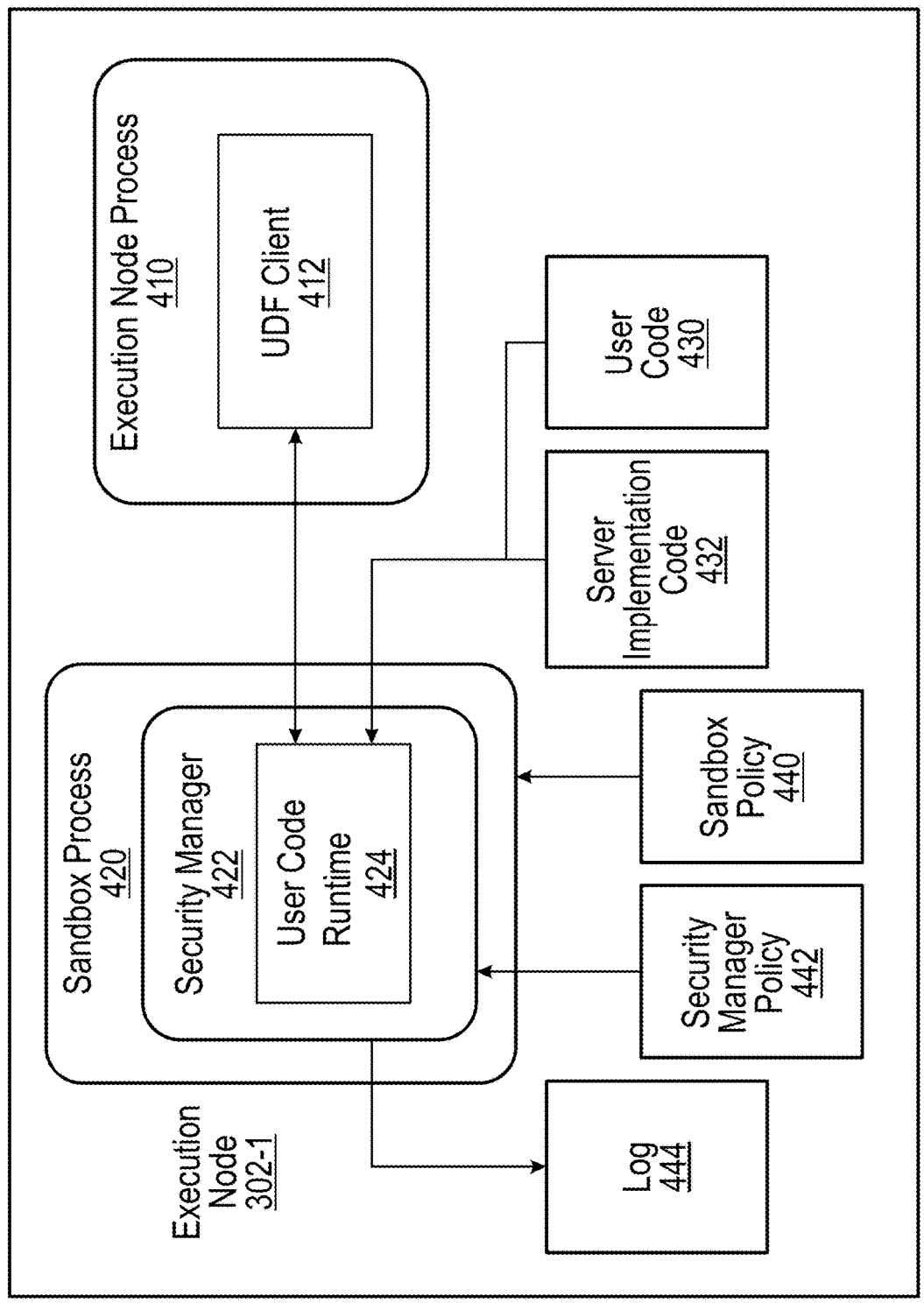
FIG. 4 is a computing environment conceptually illustrating an example software architecture executing a user defined function (UDF) by a process running on a given execution node of the execution platform, in accordance with some embodiments of the present disclosure.

FIG. 4 is a computing environment 400 conceptually illustrating an example software architecture executing a user defined function (UDF) by a process running on a given execution node of the execution platform 110, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA based UDF) can be performed by a user code runtime 424 executing within a sandbox process 420 (e.g., UDF server). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the aforementioned advantages described above.

Security Manager 422, in an example, can prevent completion of an operation from a given UDF by throwing an exception (e.g., if the operation is not permitted), or returns (e.g., doing nothing) if the operation is permitted. In an implementation, the Security Manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
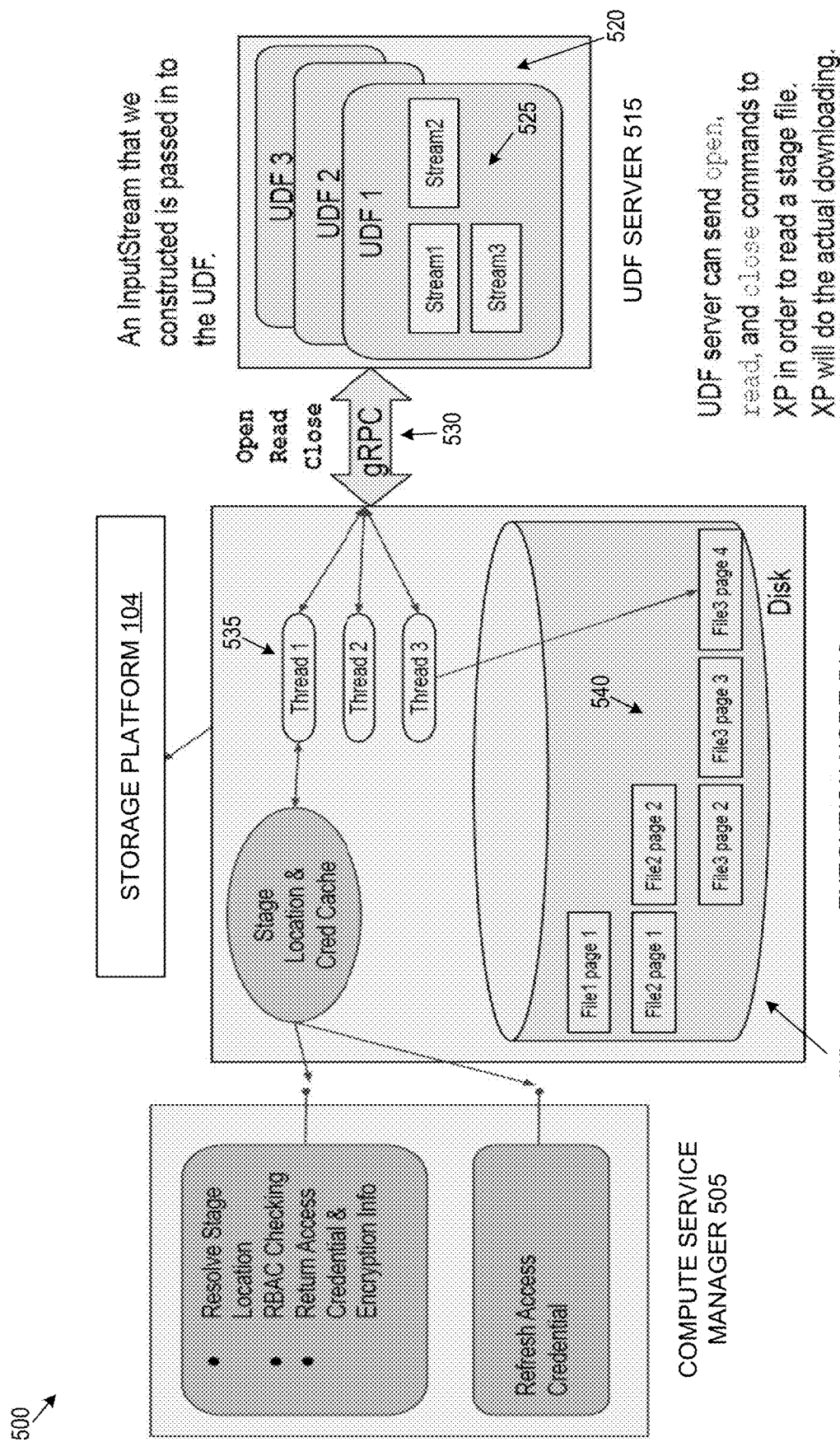
FIG. 5 shows a data architecture for implementing file access to UDFs in a staging location, in accordance with some embodiments of the present disclosure.

FIG. 5 shows a data architecture 500 for implementing file access to UDFs in a staging location, according to some example embodiments. The UDF server 515 (e.g., a child process of the XP process that runs a given execution node) can manage multiple UDFs 520 (e.g., UDF 1, UDF2, and UDF3), each of which can be defined using a UDF signature or definition, discussed in further detail below in FIG. 6. In accordance with some example embodiments, each UDF manages one or more streams 525 (e.g., Java InputStream), where the number of streams can be specified as a parameter of the function or application being specified by the end-user defining the UDF signature(s). For example, if a given UDF is a difference comparing function to compare two different files (e.g., File 3 Page 2; and File 3 page 4), then two streams (e.g., Stream1 and Stream2) can be created to process the two files (e.g., via the threads).

The UDF server 515 can open, read, or close requests to the execution node 510 (e.g., execution node 302-1) via a network interface channel 530, such as RPC (e.g., gRPC, Google Remote Procedure Call). In the execution node 510, multiple threads 535 serve the requests received from the network interface channel 530 (e.g., to perform concurrent processing of requested data). In some example embodiments, each of the threads goes through a compute service manager access point to access the compute service manager 505 (e.g., compute service manager 108) to confirm the user (e.g., the user calling the UDF) has access rights for a given file handled by the thread. If the thread has access, the compute service manager 505 passes the credential and access information to the thread and the thread access the storage platform 104 (e.g., internal stage, external object storage, external tables, etc.) and downs the files, which are stored as pages 540 on local memory 545 (e.g., disk) of the execution node 510.

Figure 6A:
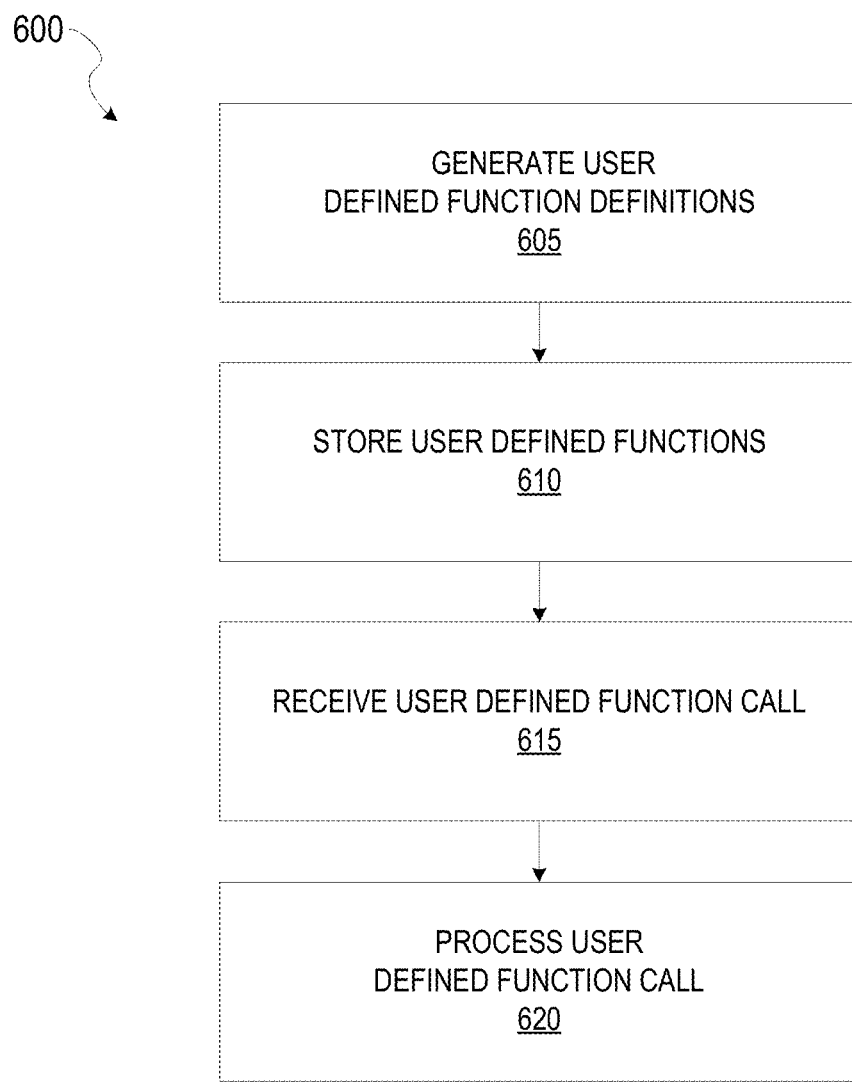
FIGS. 6A and 6B show example flow diagrams for implementing file access for user defined functions, in accordance with some embodiments of the present disclosure.

FIG. 6A shows a flow diagram of an example method 600 for implementing file access to user defined functions on a distributed database, according to some example environments. At operation 605, the function file access system 230 generates one or more user defined function definitions. For example, an end-user defines a UDF function signature as follows:

```
:::::::::::::::::CODE BEGIN:::::::::::::::::
public static int Func_123(InputStream s1, int pos1, InputStream s2, int pos2)
:::::::::::::::::CODE END:::::::::::::::::
```

At operation 610, the function fife access system 230 stores one or more user defined functions (UDFs) that correspond with the definitions of operation 605. An example UDF (e.g., a Java program) that can be uploaded and stored at operation 610 includes:

```
:::::::::::::::::CODE BEGIN:::::::::::::::::
import java.io.*;
import com.berryworks.edireader.json.fromedi. EditoJson;
public class Func_123{
    public static String Parse(InputStream in)
    {
        final EditoJson editoJson = new EditoJson( );
        editoJson.setFormatting(true); //format
        editoJson.setAnnotated(false); //annotate
        editoJson.setSummarize(false); //summarize
        StringWriter sw = new StringWriter( );
        try (Reader reader = new BufferedReader(new
InputStreamReader(in, "UTF-8"));
```

```
            Writer writer = new BufferedWriter(sw)) {
            editoJson.asJson(reader, writer);
            } catch (Exception e) {
                throw new RuntimeException(e.getMessage( ));
            }
            return sw.toString( );
        }
        ::::::::::::::::CODE END::::::::::::::::
```

At operation 615, the function file access system 230 receives a call for one of the UDFs. For example, an end-user having access to call the function inputs SQL to call the function:

```
::::::::::::::::CODE BEGIN::::::::::::::::
SELECT Func_123('@stage1/path/file1', 0, '@stage2/path/file2', 1000);
::::::::::::::::CODE END::::::::::::::::
```

At operation 620, the function file access system 230 processes the request for the UDF, as discussed in further detail below with reference to FIG. 6B. For example, at runtime the system examines the function signature, and converts the string to the UDF interface (e.g., "InputStream"), where the string input argument must contain a valid stage file handle (e.g., @stage1). Although InputStream is discussed here as an example UDF Jaya interface, it is appreciated that the system likewise other user defined function interfaces, such as Java File. RandomAccessFile, and others. Further, although Java is discussed herein as an example language being implemented in the UDF, it is appreciated that other languages (e.g., PYTHON) and other function interfaces of a given language are implemented by the function file access system 230 in accordance with some example embodiments.

Figure 6B:
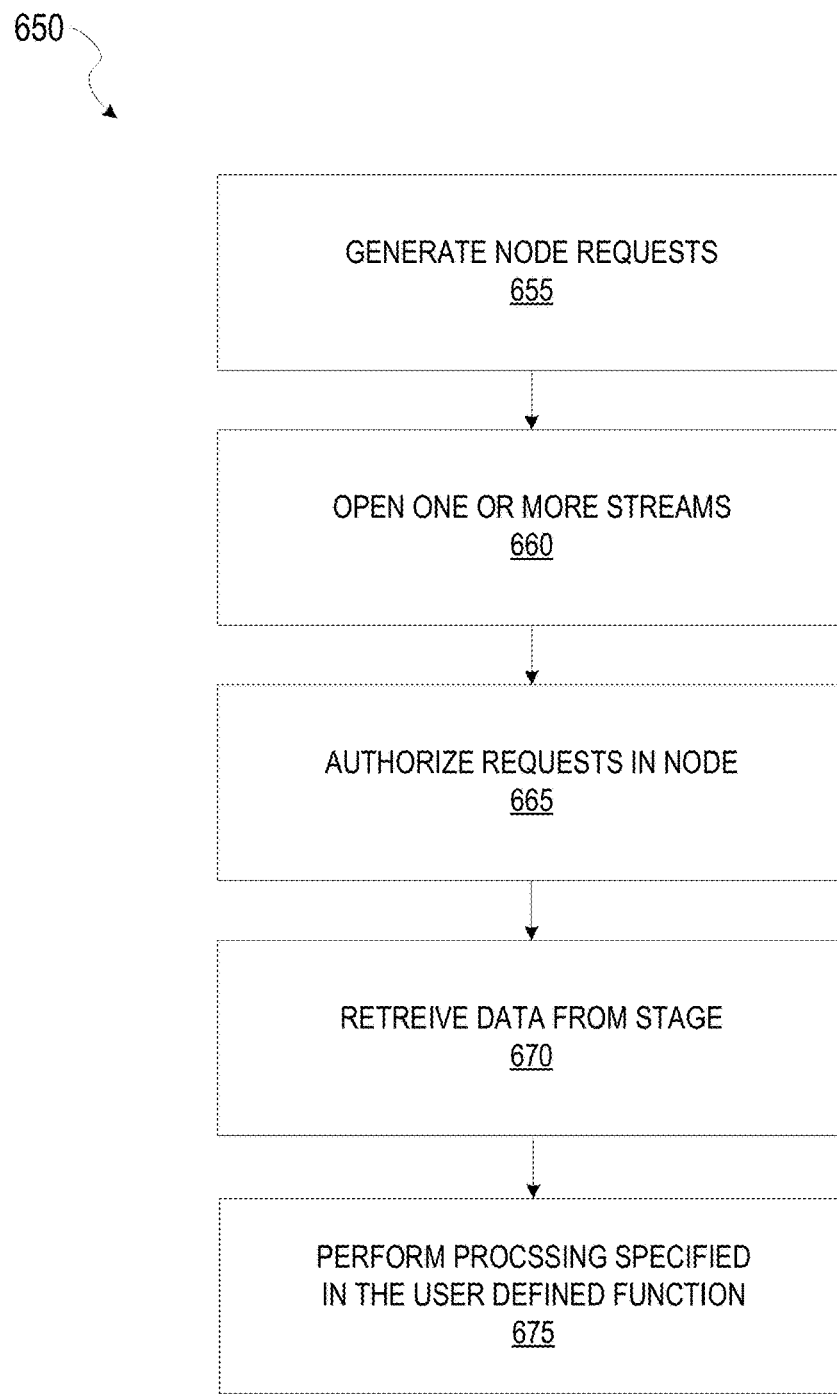

FIG. 6B shows a flow diagram of the example method 650 processing requests for UDFs, according to some example embodiments.

At operation 655, the UDF server 515 generates requests to a node. For example, the UDF server 515 opens one or more streams according to a requested UDF, and the UDF server 515 sends one or more open requests from streams (e.g., InputStreams) to the execution node 510 via the channel 530.

At operation 660, the execution node 510 receives the requests. For example, the threads 535 receive open requests from the channel 530.

At operation 665, the computer service manager 505 authorizes the requests. For example, thread 1 of the threads 535 requests authorization for access to a file in the storage platform 104, and the computer service manager 505 authorizes the thread's access (e.g., the user's access) and gives the thread access data (e.g., credentials) to access the files in the storage platform 104.

At operation 670, the execution node 510 retrieves file data from the stage. For example, each of the threads 535 concurrently requests authorization and credential data and then downloads data from the storage platform 104 to local memory of the node (e.g., disk 545) for further processing according to instructions in the called UDF at operation 675.

Figure 7:
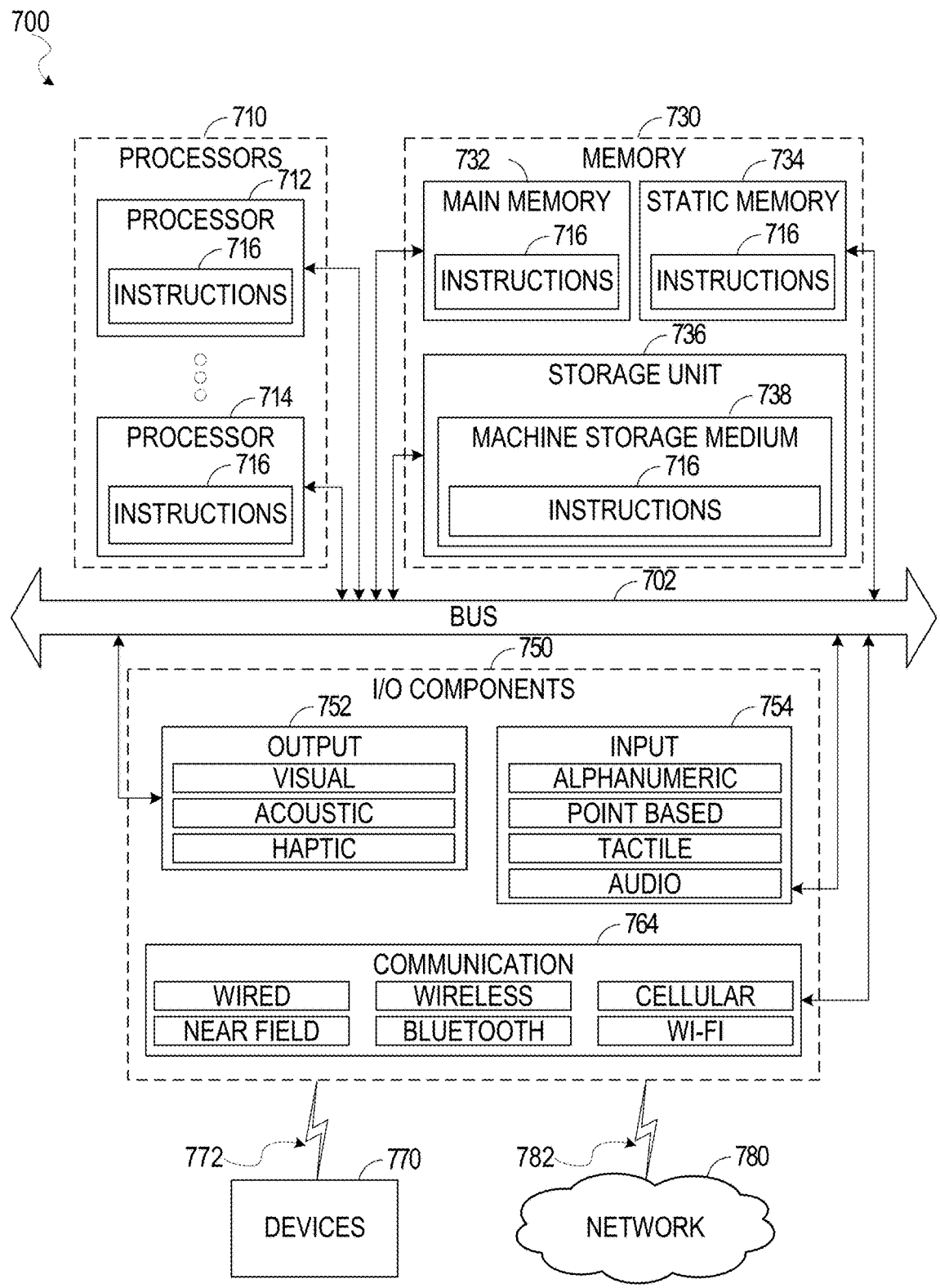
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of the method 600. As another example, the instructions 716 may cause the machine 700 to implement portions of the data flows illustrated in at least FIG. 4. In this way, the instructions 716 transform a general, non-programmed machine into a particular machine 700 (e.g., the compute service manager 108 or a node in the execution platform 110) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108 or the execution platform 110, and the devices 770 may include the client device 114 or any other computing device described herein as being in communication with the network-based data warehouse system 102 or the cloud storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth.

The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations. In view of the disclosure above, various examples are set forth below. It should be noted that one or more features of an example, taken in isolation or combination, should be considered within the disclosure of this application.

Example 1. A method comprising: receiving, in a first computing process of a network database, a plurality of user defined function definitions, each user defined function definition including a user defined function class type and function name for a function to be executed in a second computing process; receiving, by the network database, a user defined function including code related to at least one operation to be performed using the user defined function class type, the user defined function having a function name that matches one of the plurality of user defined function definitions; receiving a request to perform the user defined function, the request generated by the second computing process of the network database; activating one or more objects of the user defined function class type that correspond to the requested user defined function; retrieving, by a node of the networked database, files specified in the request using a path to a file storage stage that correspond to the one or more activated objects of the user defined class type; and storing the files on the node.

Example 2. The method of example 1, wherein the file storage stage corresponds to a external storage device that is external to the networked database.

Example 3. The method of any one or more of Examples 1 or 2, wherein the one or more objects of the user defined function class type are activated on a user defined function server.

Example 4. The method of any one or more of examples 1-3, further comprising: transmitting requests from the one or more objects to a plurality of threads of the node using a network channel within the node.

Example 5. The method of any one or more of Examples 1-4, wherein the network channel is a remote procedure call (RPC) channel.

Example 6. The method of any one or more of Examples 1-5, further comprising: determining, by the network database, each thread is authorized to access one of the files based on a user of the second computing process being previously granted access to the each of the one of the files by another user of the first computing process.

Example 7. The method of any one or more of Examples 1-6, further comprising: processing, by the second computing process, the files according to the at least one operation.

Example 8. A system comprising: one or more processors of a machine; and a memory storing instructions that, when executed by the one or more processors, cause the machine to perform operations comprising any one or more of the methods of the Examples 1-7.

Example 9. A machine storage medium embodying instructions that, when executed by a machine, cause the machine to perform operations comprising any one or more of the methods of the Examples 1-7.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
receiving, in a first database of a network database system, a plurality of database function definitions, a database function definition of the plurality of database function definitions, the database function definition specifying one or more input data streams and including a database function class type and a function name for a function to be executed in a second database of the network database system;
receiving, by the network database system, a database function including code related to at least one operation to be performed using the database function class type and the one or more input data streams specified by the database function definition, the database function having a function name that matches one of the plurality of database function definitions;
receiving a request to perform the database function, the request generated by the second database of the network database system;
activating, on a user defined function server, one or more objects of the database function class type that correspond to the requested database function, the one or more objects comprising one or more user defined function database objects;
retrieving, by the network database system, files specified in the request using the one or more input data streams and a path to a file storage stage that corresponds to the one or more activated objects of the database function class type; and
storing the files on the network database system.

2. The method of claim 1, further comprising:
generating, by a function server of the second database, results data by applying a query on the files stored on a node of the network database system, wherein the files are provided to the function server over a network channel in the node.

3. The method of claim 2, wherein the network channel is a remote procedure call (RPC) channel.

4. The method of claim 1, wherein the file storage stage corresponds to a external storage device that is external to the network database system.

5. The method of claim 1, further comprising:
determining, by the network database system, each thread is authorized to access one of the files based on a user of the second database being previously granted shared access to the each of the one of the files by the first database.

6. The method of claim 1, wherein the database function is a database code file, and the method further comprises:
processing, by the second database, the files according to one or more instructions in the code of the database code file.

7. The method of claim 6, wherein the database code file is a Java Application Programming (JAR) file.

8. The method of claim 1, wherein the one or more objects are Java Virtual Machines (JVMs).

9. The method of claim 1, wherein the one or more objects are activated using a database query generated by the second database.

10. The method of claim 9, wherein the database query comprises a select statement that includes the function name of the database function.

11. The method of claim 10, wherein the each of the plurality of database function definitions is a shareable function that is generated on the network database system by the first database, wherein the first database shares access to the shareable function for execution on the second database.

12. The method of claim 1, wherein the database function class type is an input stream class.

13. A system comprising:
one or more processors of a machine; and
at least one memory storing instructions that, when executed by the one or more processors, cause the machine to perform operations comprising:
receiving, in a first database of a network database system, a plurality of database function definitions, a database function definition of the plurality of database function definitions, the database function definition specifying one or more input data streams and including a database function class type and a function name for a function to be executed in a second database of the network database system;
receiving, by the network database system, a database function including code related to at least one operation to be performed using the database function class type and the one or more input data streams specified by the database function definition, the database function having a function name that matches one of the plurality of database function definitions;
receiving a request to perform the database function, the request generated by the second database of the network database system;
activating, on a user defined function server, one or more objects of the database function class type that correspond to the requested database function, the one or more objects comprising one or more user defined function database objects;
retrieving, by the network database system, files specified in the request using the one or more input data streams and a path to a file storage stage that corresponds to the one or more activated objects of the database function class type; and
storing the files on the network database system.

14. The system of claim 13, further comprising:
generating, by a function server of the second database, results data by applying a query on the files stored on a node of the network database system, wherein the files are provided to the function server over a network channel in the node.

15. The system of claim 14, wherein the network channel is a remote procedure call (RPC) channel.

16. The system of claim 13, wherein the file storage stage corresponds to a external storage device that is external to the network database system.

17. The system of claim 13, further comprising:
determining, by the network database system, that each thread is authorized to access one of the files based on a user of the second database being previously granted shared access to the each of the one of the files by the first database.

18. The system of claim 13, wherein the database function is a database code file, and the system further comprises:
processing, by the second database, the files according to one or more instructions in the code of the database code file.

19. The system of claim 18, wherein the database code file is a Java Application Programming (JAR) file.

20. The system of claim 13, wherein the one or more objects are Java Virtual Machines (JVMs).

21. The system of claim 13, wherein the one or more objects are activated using a database query generated by the second database.

22. The system of claim 21, wherein the database query comprises a select statement that includes the function name of the database function.

23. The system of claim 22, wherein the each of the plurality of database function definitions is a shareable function that is generated on the network database system by the first database, wherein the first database shares access to the shareable function for execution on the second database.

24. The system of claim 13, wherein the database function class type is an input stream class.

25. A machine storage medium embodying instructions that, when executed by a machine, cause the machine to perform operations comprising:

receiving, in a first database of a network database system, a plurality of database function definitions, a database function definition of the plurality of database function definitions, the database function definition specifying one or more input data streams and including a database function class type and a function name for a function to be executed in a second database of the network database system;

receiving, by the network database system, a database function including code related to at least one operation to be performed using the database function class type and the one or more input data streams specified by the database function definition, the database function having a function name that matches one of the plurality of database function definitions;

receiving a request to perform the database function, the request generated by the second database of the network database system;

activating, on a user defined function server, one or more objects of the database function class type that correspond to the requested database function, the one or more objects comprising one or more user defined function database objects;

retrieving, by the network database system, files specified in the request using the one or more input data streams and a path to a file storage stage that corresponds to the one or more activated objects of the database function class type; and storing the files on the network database system.

26. The machine storage medium of claim 25, further comprising:

generating, by a function server of the second database, results data by applying a query on the files stored on a node of the network database system, wherein the files are provided to the function server over a network channel in the node.

27. The machine storage medium of claim 26, wherein the network channel is a remote procedure call (RPC) channel.

28. The machine storage medium of claim 25, wherein the file storage stage corresponds to an external storage device that is external to the network database system.

29. The machine storage medium of claim 25, the operations further comprising: determining that each thread is authorized to access one of the files based on a user of the second database being previously granted shared access to the each of the one of the files by the first database.

30. The machine storage medium of claim 25, wherein the database function is in a database code file, and wherein the second database processes the files according to one or more instructions in the code of the database code file.

\* \* \* \* \*

UNITED STATES PATENT AND TRADEMARK OFFICE
CERTIFICATE OF CORRECTION

| | | |
|---|---|---|
| PATENT NO. | : 11,645,243 B2 | Page 1 of 1 |
| APPLICATION NO. | : 17/522276 | |
| DATED | : May 9, 2023 | |
| INVENTOR(S) | : Brossard et al. | |

It is certified that error appears in the above-identified patent and that said Letters Patent is hereby corrected as shown below:

On the Title Page

On page 2, in Column 1, under Item (56) "U.S. Patent Documents", Line 17, delete "2019/0008981" and insert --2019/0089810-- therefor On page 2, in Column 1, under Item (56) "U.S. Patent Documents", Line 18, delete "2019/0020541" and insert --2019/0205410-- therefor Signed and Sealed this
Thirteenth Day of August, 2024

Katherine Kelly Vidal
*Director of the United States Patent and Trademark Office*